United States Patent [19]

Moore et al.

[11] 4,185,460
[45] Jan. 29, 1980

[54] ENGINE POWER MANAGEMENT SYSTEM

[75] Inventors: M. Samuel Moore; Charles F. Paluka, both of Northridge, Calif.

[73] Assignee: Semco Instruments, Inc., North Hollywood, Calif.

[21] Appl. No.: 864,857

[22] Filed: Dec. 27, 1977

[51] Int. Cl.² ............................ F02K 3/12; F02C 9/04
[52] U.S. Cl. ..................................... 60/224; 60/243; 60/39.28 R
[58] Field of Search .................. 60/39.28 P, 39.28 R, 60/224, 243

[56] References Cited

U.S. PATENT DOCUMENTS

| 2,667,228 | 1/1954 | Wood et al. | 60/39.28 P |
| 2,977,756 | 4/1961 | Stone | 60/39.28 P |
| 3,123,974 | 3/1964 | Pearson et al. | 60/39.28 R |
| 3,203,179 | 8/1965 | Blackaby | 60/39.28 R |
| 3,514,949 | 6/1970 | Fredlake et al. | 60/39.28 R |
| 3,969,890 | 7/1976 | Nelson | 60/39.28 P |

Primary Examiner—Robert E. Garrett

Attorney, Agent, or Firm—Poms, Smith, Lande & Rose

[57] ABSTRACT

An aircraft having two turbine engines is provided with both torque and temperature sensitive electronic circuitry to control the fuel supplied to the turbine engines. Pushbutton switches are provided for the selection of the desired torque level by the pilot. The fuel to either engine is reduced, regardless of output torque and its relationship to the pushbutton values of selected torque, when the engine temperature exceeds a predetermined safety level. Failsafe operation is provided through the use of a main fuel supply path including a manual fuel control valve extending from the fuel pump to the engine fuel nozzles, and a normally closed bypass fuel control line which selectively diverts fuel from the principal path under the control of the temperature and torque responsive electronic circuitry. An electromagnetically operated valve in the bypass line is normally closed and is selectively operated to the desired open condition under the control of the torque and temperature responsive circuitry mentioned above, to reduce fuel supplied to the turbine engines.

25 Claims, 8 Drawing Figures

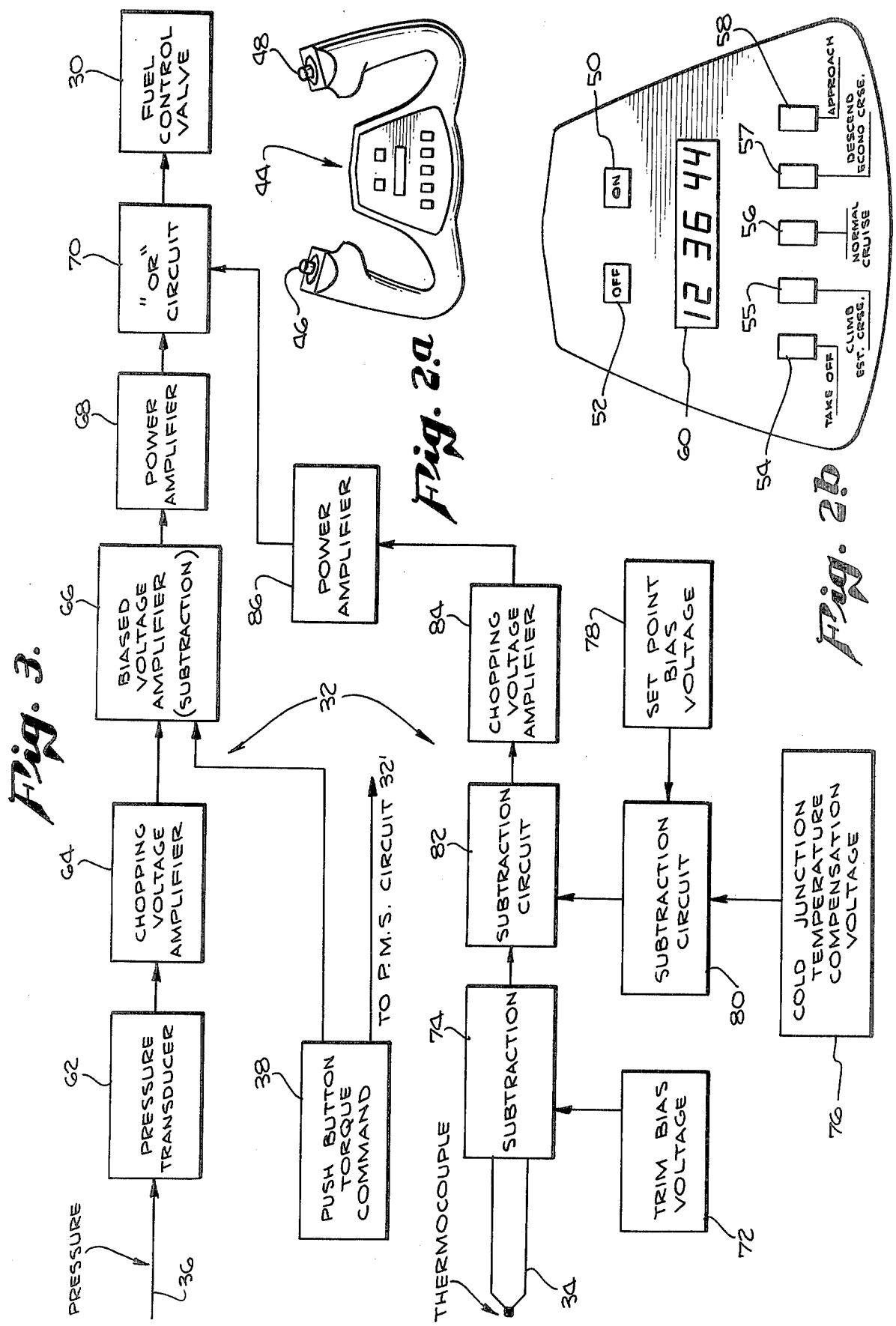

ENGINE POWER MANAGEMENT SYSTEM

FIELD OF THE INVENTION

This invention relates to turbine engine fuel control systems.

BACKGROUND OF THE INVENTION

The fuel control system which have been employed for the control of aircraft turbine engines up to the present time have generally been hydro-pneumatic systems. Unfortunately, these systems tend to be sluggish and inflexible, and are subject to malfunction under certain aircraft conditions such as those involving acrobatic maneuvers, for example. In addition, existing automatic flight control equipment does not provide the flexibility which would be desired for such systems.

Accordingly, a principal object of the present invention is to provide a more convenient and flexible turbine power management and control system which has a more rapid response and which is not subject to the occasional malfunctions of existing hydro-pneumatic equipment. A collateral object of the present invention is to provide such a system in a failsafe arrangement which will preclude interference with normal operation of the aircraft engines under emergency conditions or in the eventuality that the power management system might malfunction.

SUMMARY OF THE INVENTION

In accordance with one important aspect of the invention, a failsafe turbine engine power management system includes a principal fuel flow path and a bypass fuel control path with a control valve normally mechanically biased into the closed position. This control valve is selectively operated to the desired control position in accordance with electronic circuitry which is both responsive to temperature and which determines the torque output of the engine in accordance with pushbutton controls to be operated by the pilot in selecting the desired torque output levels.

In accordance with another aspect of the invention, the torque level selection controls, under the control of the pilot, which may be in the form of pushbuttons on the pilot hand wheel, are utilized to control the operating levels of one or more turbine engines; and overriding temperature responsive control circuitry limits fuel flow to an overheated engine when its temperature exceeds predetermined limits.

In accordance with a subordinate aspect of the invention, the rate of change of the signal controlling torque or temperature of the jet engines is limited at lower levels of disparity between the actual torque and the selected desired torque, but the permitted rate of change of torque is increased at higher differences in torque, for example, to more rapidly bring the engines to the desired torque levels, or provide temperature limiting, without causing engine "hunting" or oscillation.

Advantages of the electronic circuitry and the complete fuel control system include more precise and accurate, as well as more rapid, response; adjustment of the engine closer to the selected torque, and a reduction in the weight of the control equipment as compared with hydro-pneumatic equipment. In addition, a smoother and more precise acceleration schedule may be obtained, and the electronic control system of the invention also permits the elimination of anti-surge equipment now required in some turbine engines to prevent compressor surge, and resultant engine malfunction or failure which occasionally occurs.

Other objects, features, and advantages of the present invention will become apparent from a consideration of the following detailed description taken in conjunction with the accompanying drawings.

BRIEF DESCRIPTION OF THE DRAWINGS

FIGS. 2a and 2b represent a pilot hand wheel equipped with push-button torque command controls;

FIG. 3 is a block circuit diagram of one implementation of the power management system blocks shown as one part of the system of FIG. 1;

DETAILED DESCRIPTION

Figure 1:
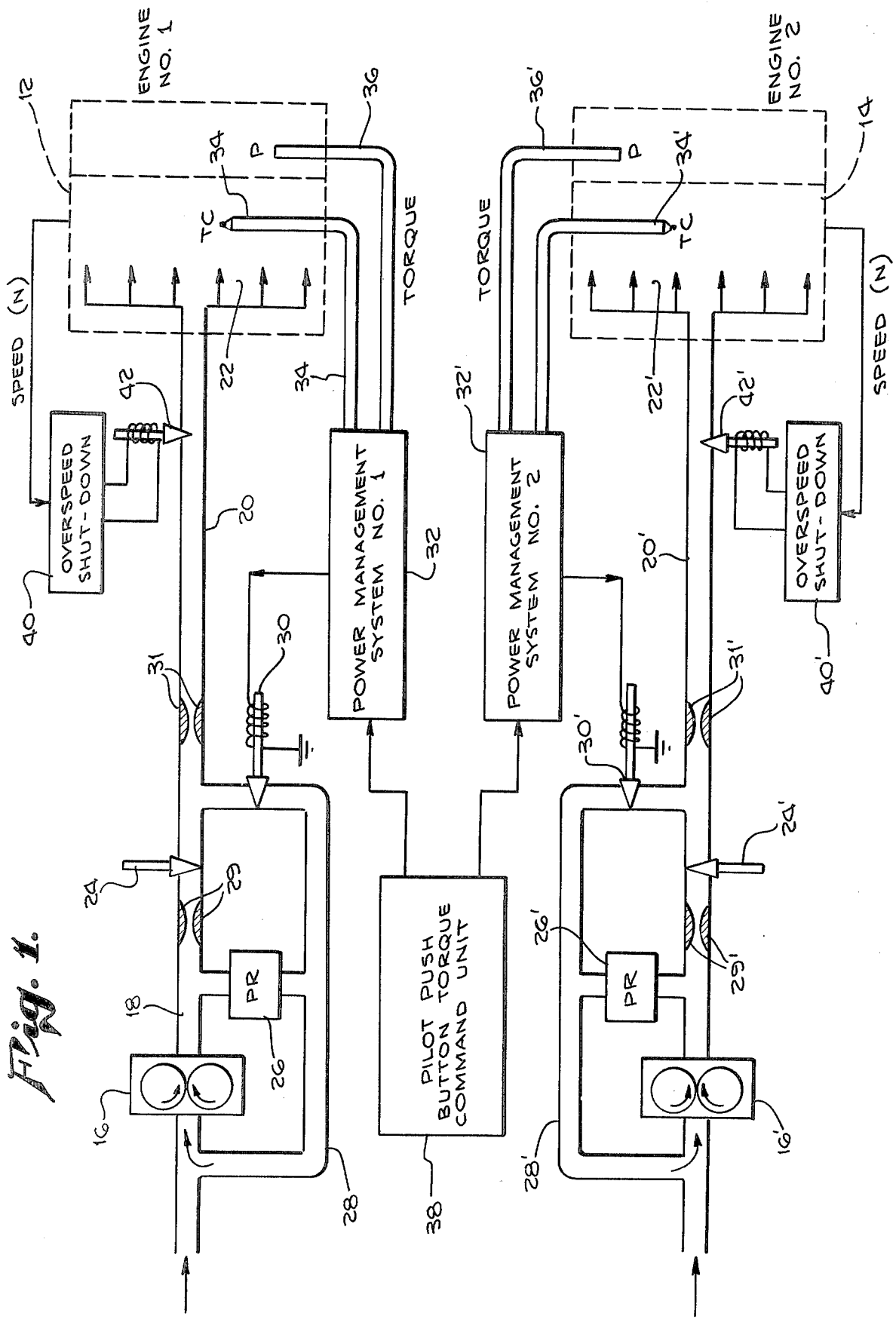
FIG. 1 is a block diagram of a fuel control system for a two engine aircraft using the power management system of the present invention.

Referring more particularly to the drawings, FIG. 1 has a schematic showing of two turbine engines 12 and 14. The fuel is supplied from fuel pump 16 through fuel lines 18 and 20 to the fuel nozzles 22 in each turbine engine. The main manual fuel control throttle 24 is shown directly controlling the fuel flow in the main path from the high pressure fuel pump 16 to the engine fuel nozzles 22 between fuel lines 18 and 20. The pressure relief valve 26 permits fuel flow back to the input of fuel pump 16 when the throttle 24 is closed.

An additional fuel control path 28 is provided to divert fuel from the main fuel line 18, 20, under control of the electromagnetically operated valve 30, in cooperation with restrictions 29 and 31 in the main fuel path. The valve 30 is normally biased to the closed position, and is selectively opened to control fuel flow in accordance with control signals provided by power management system 32. Inputs to the power management system 32 include a temperature signal from the thermocouple 34, a pressure signal indicating torque which is supplied over tube 36 and which is derived from the gear box at the output of the turbine engine and finally signals from the pilot push-button torque command unit 38, indicating the desired level of torque from the two turbine engines.

Incidentally, the system associated with engine No. 2 is substantially the same as that described hereinabove, and primed reference numerals are employed to indicate comparable components for circuits associated with turbine engine 14. In addition to the system apparatus noted above, the overspeed shutdown circuits 40 and 40' may be included to individually reduce the engine operating speed when either of the engines is exceeding rated speed levels.

FIG. 2a is a showing of a pilot's handwheel, or control wheel 44 which is employed to control the attitude of the aircraft. Included on the handwheel 44 are the usual auto pilot disconnect control switch 46 and additional switches such as switch 48 which may control transponder identification equipment, the microphone keying switch, a map light switch, or the like. The fuel control power management system push-buttons shown in FIG. 2b are mounted on the central face of the handwheel control unit. More specifically, they include the "on" push-button switch 50, the "off" pushbutton switch 52, and five additional push-button switches 54 through 58 for setting various desired levels of torque. These various levels of desired torque would include torque levels appropriate for the following: (1) takeoff, (2) climb or fast crusing, (3) normal cruise, (4) descend or economy cruising, and (5) approach. In practice, the pilot would depress the desired push-button on the power management system console, and open the manual fuel control throttles 24 and 24' substantially wide open, or at least substantially above the power levels indicated by the pushbutton which has been selected. The power management system 32, as shown in FIG. 1, will then throttle back the fuel level by selectively opening the bypass valves 30 and 30' so that the aircraft engine output torque is adjusted to the level preselected by the pilot. It may be noted in passing that the system of FIG. 1 is arranged in a failsafe mode with the bypass valves 30 and 30' closing in case of power failure from the power management system 32 and 32', with the result that control reverts to the manual fuel control valves 24 and 24'. It may further be noted that increasing output power from the power management systems 32 and 32' results in the opening of the bypass valves 30 and 30', and the resultant reduction in fuel to the two engines.

At the center of the control wheel assembly 44, an "LED" or similar clock or elapsed time display 60 may be provided, if desired.

FIG. 3 is a block circuit diagram indicating the functions included in the power management circuit 32 shown in FIG. 1. From an overall standpoint, it may be noted in FIG. 3 that the inputs at the left include the source of pressure 36, the thermocouple 34, and the pushbutton torque command signal source 38. The source of pressure 36 is converted by pressure transducer 62 to a low level analog voltage representing the output torque from engine 12. Following amplification by the chopper amplifier 64, the actual torque as indicated by the signal from amplifier 64 is compared with an analog voltage proportional to the desired torque from torque command unit 38 in the subtraction circuit 66, and the resultant difference signal is amplified in the power amplifier 68 and is applied through an "OR" circuit 70 to the fuel control valve 30 associated with engine 12.

The thermocouple signal from thermocouple 34 is subject to several corrections and adjustments. Initially, the trim bias voltage adjustment provided by the source 72 is employed to normalize the temperature readings of all engines to a standard level lower than that of any production engine. This trim bias is adjusted separately for each engine and results from the variation of as much as 10% in the temperature at which rated horsepower is developed. Following correction in the subtraction circuit 74, additional compensation is provided by circuits 76 and 78 which correct for the cold junction temperature, and provide set point biasing, respectively. This is accomplished through the subtraction circuits 80 and 82. Again, a low drift chopper-type amplifier 84 is employed for amplifying the low level signals originating with the thermocouple. Following power amplification by circuit 86, the temperature signal is combined with the torque signal in the "OR" circuit 70 and applied to valve 30. It may be noted that the OR circuit 70 passes the larger of the temperature signal or the pressure correction signal which act to open the bypass valve 30 and thus reduce fuel to the engine. Accordingly, the temperature signal, if the engine is overheating, will override the torque level control signal and reduce the fuel to the engine until temperature is restored to normal temperature levels.

Figure 4A:
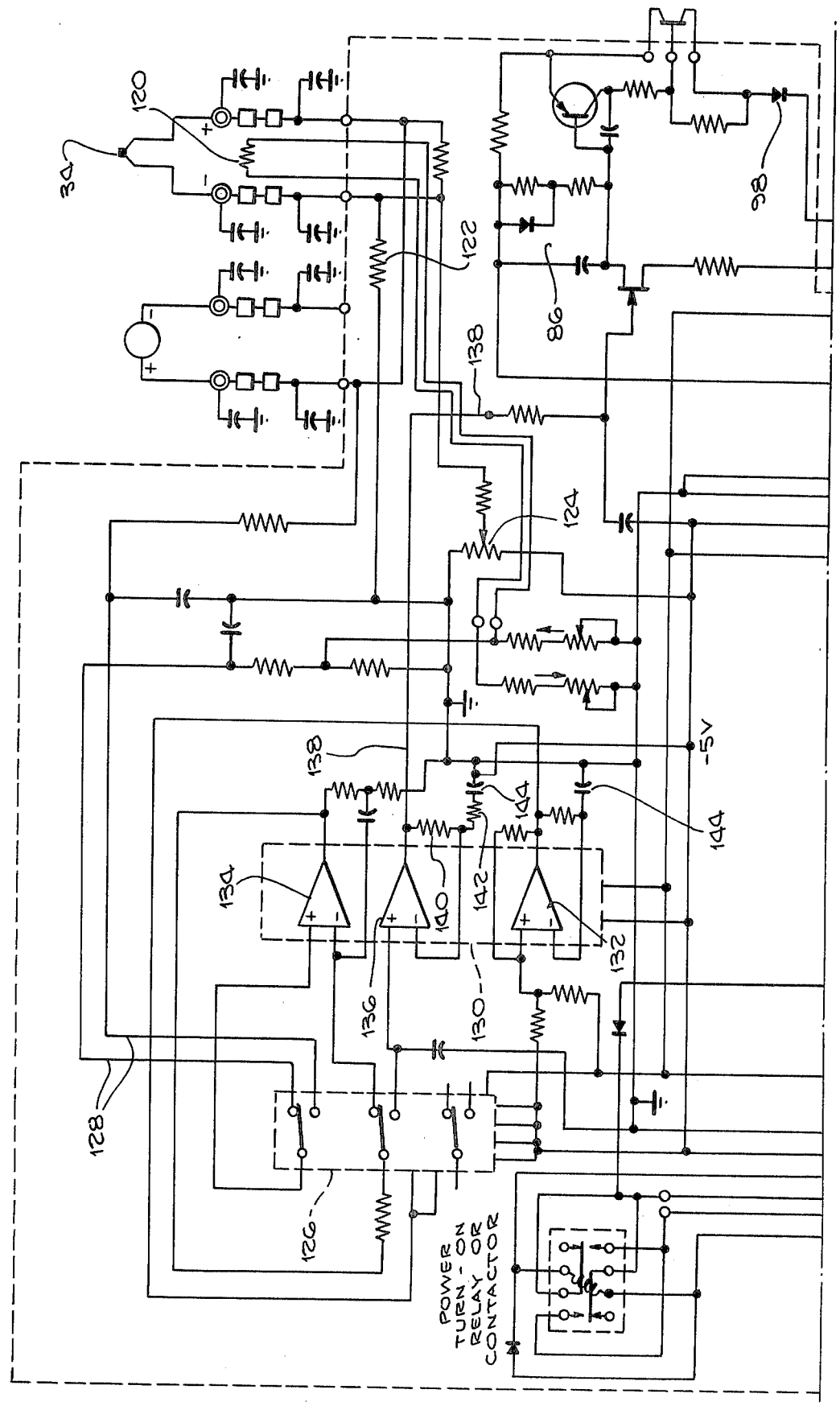
FIGS. 4a through 4c make up a detailed circuit diagram of the power management system shown schematically in FIG. 3.
Figure 4B:
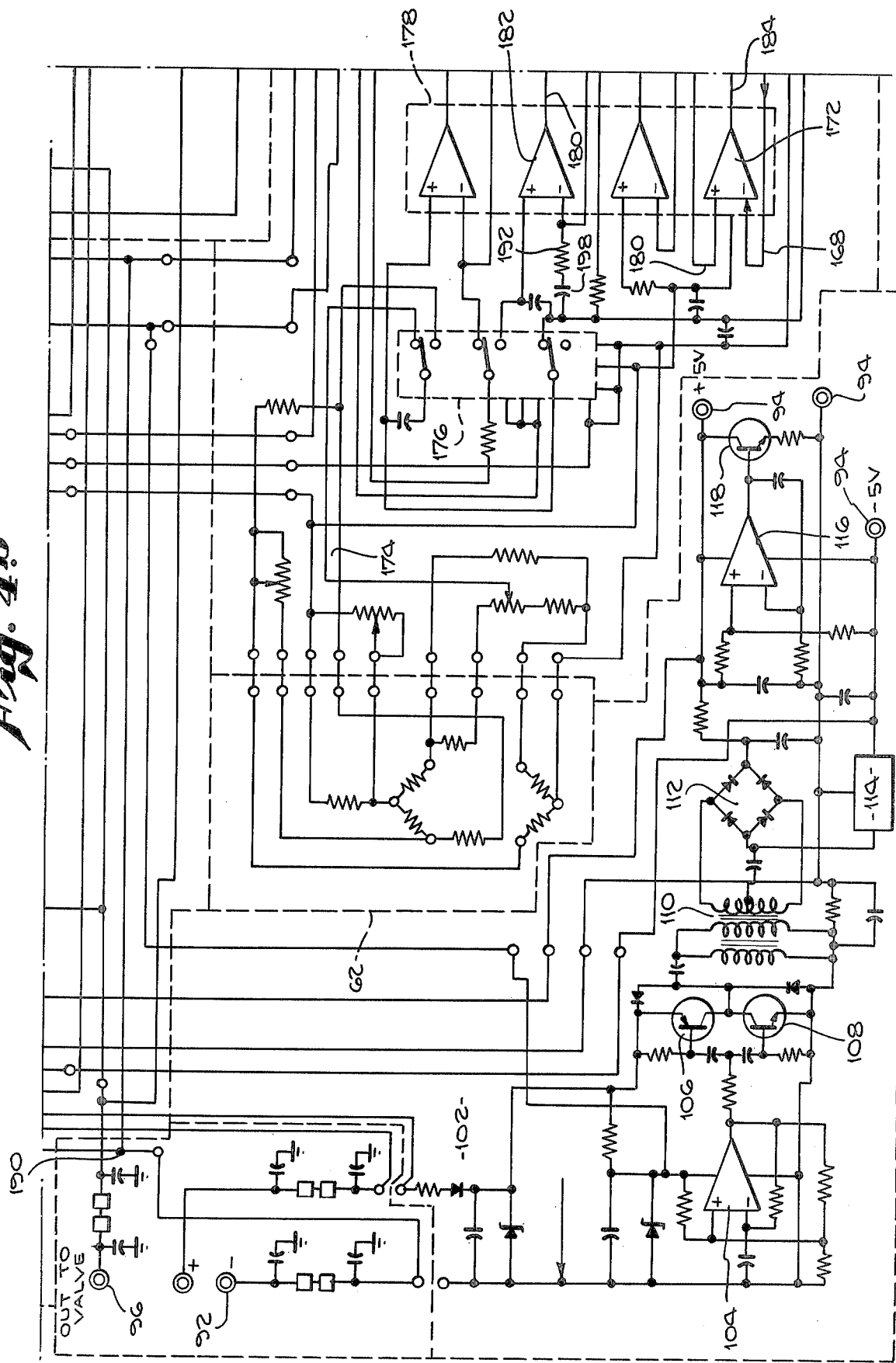
Figure 4C:
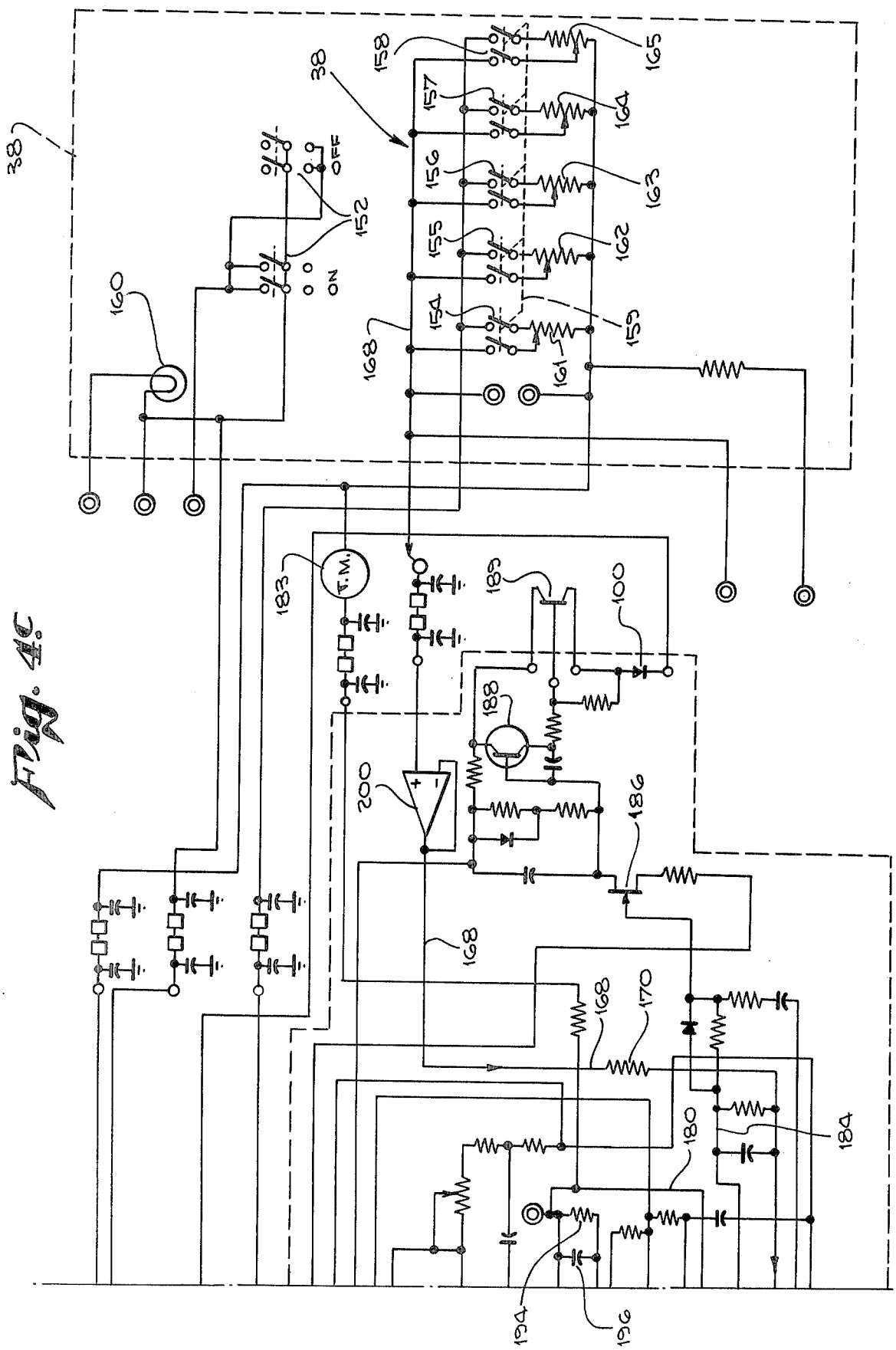

FIGS. 4a through 4c show a detailed circuit diagram which is generally co-extensive with the block circuit diagram of FIG. 3. To indicate the major circuit functions of FIG. 4, and the general layout of the diagram, it may be noted that the thermocouple 34 is located at the upper right hand side of FIG. 4a; that the pilot pushbutton console 38 is located at the right hand side of FIG. 4c; that the strain gauge 62 constituting the pressure transducer of FIG. 3 is located toward the left center of FIG. 4b, and the power supply for converting the 28-volt input voltage at terminals 92 to the plus/minus 5 volts at terminals 94, is located in the extreme lower left portion of FIG. 4b. The output terminal 96 leading to valve 30 appears toward the top at the left-hand side of the FIG. 4b. The OR circuit 70 is implemented in FIG. 4 by the two diodes 98 (FIG. 4a) and 100 (FIG. 4c). Incidentally, in the following description, the precise details of every resistor, capacitor, and transistor will not be reviewed, as their operation is generally self-explanatory. However, the interrelation of some of the major circuit components will be reviewed briefly.

In considering the mode of operation of the power supply 102, which converts the 28-volt aircraft input at terminals 92 down to the plus and minus five volts at terminals 94, it includes an oscillator chip 104 having a frequency of approximately 2 kilohertz. This is amplified for chopper action by transistors 106 and 108, and following appropriate stepdown action by transformer 110, the full wave rectifier 112 and voltage regulator 114 cooperate with the operational amplifier 116 and the transistor 118 to provide a carefully regulated plus and minus low voltage DC output at terminals 94.

Concerning the temperature control circuit which appears toward the upper portion of FIG. 4, in addition to thermocouple 34, it includes the temperature sensitive Balco resistor 120 which compensates for the temperature of the cold junctions. In addition, the trim bias resistor 122 and the trim bias level control potentiometer 124 are worthy of note. The corrected temperature is supplied to the chopper circuit 126 on leads 128. Circuit chip 130 may be implemented by Texas Instrument C-MOS Circuit Part No. TL084MJ. The chopper circuit 126 may be implemented by Fairchild Part No. 4053. In the chip 130, the squareware generator 132 provides output signals to operate the switching circuit 126. The amplifier 134 and the output follower 136 are interconnected with the chopper switching circuit 126 to provide an output on lead 138 which is relatively insensitive to amplifier drift, despite the relatively low levels (in the order of tens of millivolts) of the temperature signal derived from thermocouple 34. The output signal from lead 138 is amplified in the power amplifier circuit 86 and supplied to valve 30 through diode 98 and terminal 96 as mentioned previously.

Incidentally, the circuit at the output of the output follower 136, including resistors 140 and 142 and capacitor 144 is worthy of note. This circuit, particularly including capacitor 144, provides an output signal when rapid changes in temperature occur, but provides a much slower response when smaller and less rapid temperature changes occur. This is accomplished by the operational amplifier 136, with its output connected through resistor 140 to the negative or inverting input. With the very high gain of operational amplifier 136, the potential at the negative input will be forced to closely follow the input to the positive terminal. With a slowly changing temperature signal, the capacitor and resistor network will have little effect. However, when the temperature signal at the positive input increases rapidly in a positive sense (increasing temperature), current is caused to flow through resistors 140 and 142, as capacitor 144 is charging. The resulting voltage differential across resistor 140 will cause the output voltage from operational amplifier 136 to lead the input.

With reference to the push-button control of torque, attention is directed to the pilot push-button controls 38, including the on-off switch 152 and the torque control switches 154 through 158. The push buttons 154 through 158 are mechanically intercoupled as indicated by dashed lines 159 so that they latch into the "on" position when depressed, and release all of the other four push-buttons of the set. The on-off push-buttons 152 serve to energize the indicator lamp 160 when the system is turned on. The potentiometers 161 through 165 establish the torque levels required for each engine with the specific torque commands indicated by the various push-buttons 54 through 58 as shown in FIG. 2. With the potentiometers 161 through 165 set to the appropriate levels, ranging from takeoff power through approach power, the pilot advances the throttle to the maximum available power level, and depresses the desired push-button. This serves to reduce the power supplied to the engines as a result of the torque command signal supplied from one of the potentiometers 161 through 165 on the torque command circuit 168. The torque command circuit may be traced to the left through the small resistor 170 to the negative input of the differential amplifier 172. Incidentally, push-button 154 provides takeoff power, as indicated by the legend near push-button 54 in FIG. 2b; and the setting of potentiometer 161 limits the maximum power output from the engine to avoid damaging the engine.

The actual torque developed by the engine is measured by the pressure transducer, or strain gauge 62. The output leads 174 from the strain gauge 62 are supplied to the semiconductor chips 176 and 178 which constitute a chopper amplifier which operates in substantially the same manner as the chips 126 and 130 described hereinabove. Again, the chip 176 may be a Frairchild type 4053 chip, and the chip 178 may be a Texas Instrument TL084MJ chip. In connection with chip 130, one of the four available amplifier units is used in FIG. 4c to implement amplifier 200. In connection with the identical chip 178 employed in the torque control circuit, in FIG. 4b, the operational amplifier 172 is connected as a differential amplifier, and the torque command on lead 168 is compared with a signal representing the actual torque, on lead 180 from the output of amplifier 182. Incidentally, meter 183, also coupled to the output of amplifier 182, displays the actual output torque of the turbine engine. With the signal representing the actual torque being supplied to lead 180 at the positive input of differential amplifier 172, and the torque command being supplied to the negative input of the same differential amplifier 172, the difference signal appears on lead 184 and represents the desired change in current to be supplied to the fuel control valve. Of course, prior to application to the fuel control valve, the relatively low level signal on lead 184 is amplified by the transistor amplifier 186, and by the amplifier including transistors 188 and 189. Thereafter, as mentioned above, the torque control signal is transmitted through diode 100, forming one of the two diodes of OR gate 70 (see FIG. 3), and the resultant signal from either diode 98 or diode 100, which are connected to the common circuit point 190, are then connected to the output terminal 96 leading to valve 30.

Suitable circuitry to permit rapid response when torque levels are changing rapidly, but to avoid overshoot and oscillation under stable conditions, or when torque is changing more slowly and balance is being approached, is provided by amplifier 182 and its immediately associated circuitry. More particularly, attention is directed to resistors 192 and 194 which constitute a divider with their intermediate point connected to the negative input terminal of the differential amplifier 182. Further, with the capacitor 196 being relatively small, and the capacitor 198 being relatively large, the result is that rapid changes in input voltage are transmitted through the amplifier and applied to output lead 180, while, for slower changes in the input torque signal to amplifier 182, the time constant of the response is reduced and a slower change is observed at output lead 180. This is a result of the same mode of operation as described above in connection with operational amplifier 136 and its immediately associated circuitry.

Figure 5:
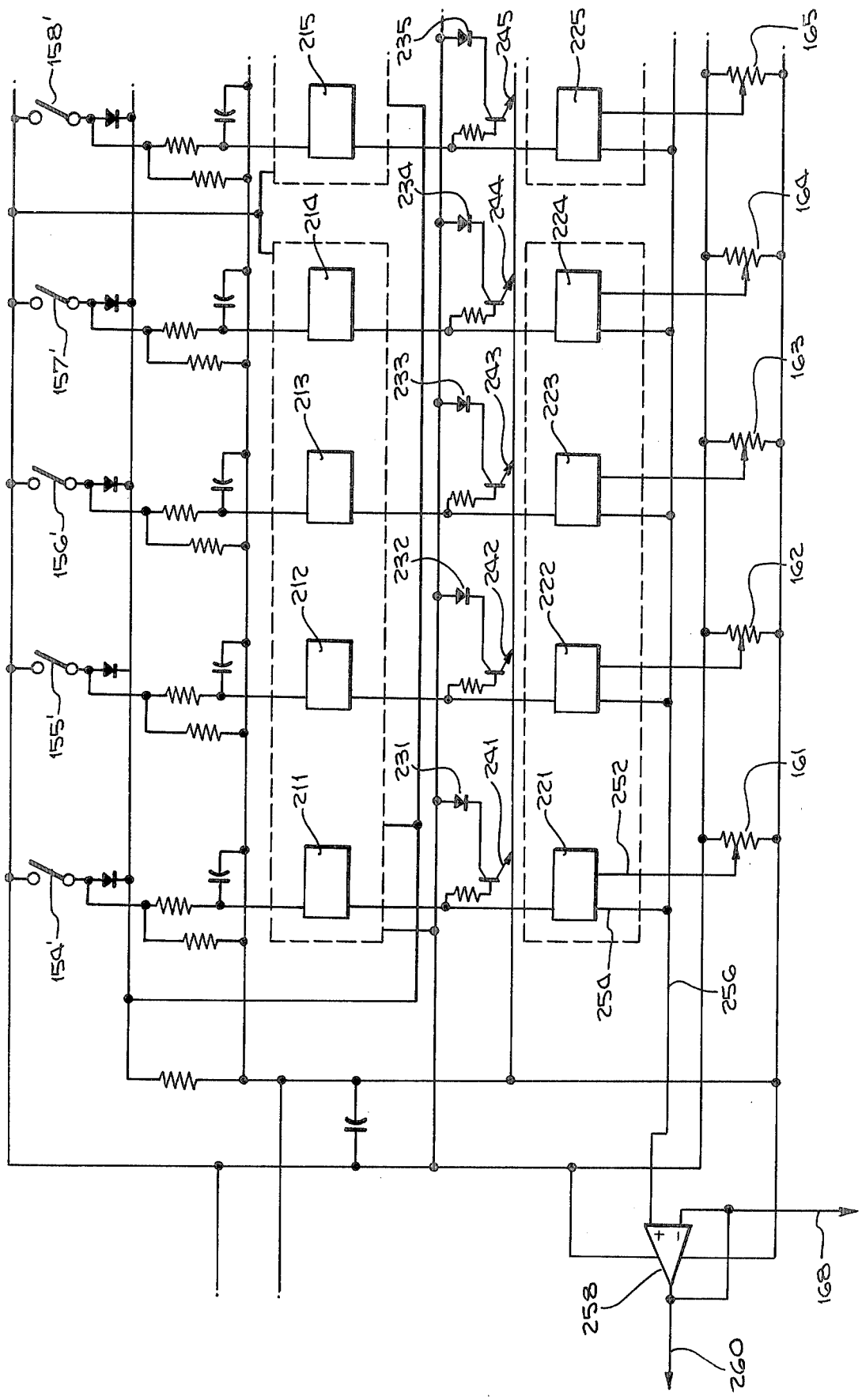
FIG. 5 is an electronic latching circuit which may be used in the circuit of FIG. 4.

FIG. 5 is an alternative circuit which may be sustituted for a portion of the circuit of FIG. 4c, and essentially involves an electronic latching and indicating circuit in contrast to the mechanical interlocking and latching arrangement shown at the far right hand side in FIG. 4c.

From an overall standpoint, it may be noted that the output circuit 168 which appears at the lower left hand corner of FIG. 5 constitutes the output circuit 168 of FIG. 4c which is amplified by the operational amplifier or follower circuit 200 and then applied to the negative terminal of differential amplifier 172. The push-buttons 154' through 158' of FIG. 5 are momentary touch type buttons which are spring biased to the open condition, in contrast to the mechanically interlocked switches 154 through 158 of FIG. 4c. In FIG. 5 the same type of potentiometer 161 through 165 is employed to provide the control voltages which determine the power to the turbine engines.

Two sets of key components included in the circuit of FIG. 5 are the latches 211 through 215 and the analog transmission switches 221 through 225. The latches may be implemented by Fairchild part F4042, and the analog type switches may be implemented by Fairchild part F4066. Suitable indicator lights are provided for each level of power; amd these lights are implemented by the light emitting diodes 231 through 235, which are controlled by the transistors 241 through 245, respectively.

Concerning the mode of operation of the electronic latching and indicating circuit of FIG. 5, let us first consider the case when one of the switches 154' is depressed. This action will apply +5 volts to the latch 211 and therefore turn it on. With a voltage level of approximately ground or zero volts being applied to the control input of the other latches 212 through 215, at the time of arrival of the enabling signal, they will all be set to their "off" states. Now, with latch 211 on and the remaining latches 212 through 215 off, the LED 231 is illuminated and the analog switch 221 is energized. Accordingly, the control signal from potentiometer 161 is routed on lead 252 to switch 221 and coupled to output lead 254 from switch 221 and then to the common output lead 256 leading to the output follower 258. With the output terminal 260 of the operational amplifier 258 connected to the negative input terminal of the operational amplifier, it provides a powerful output which may be coupled both to a second power management system on lead 260, and also to the local power management circuit as shown in FIGS. 4a through 4c on lead 168.

The specific circuit of FIG. 4 is particularly intended for use in which fuel reduction is accomplished by an increased signal which is supplied to terminal 96. As indicated in FIG. 1, this may be a solenoid-operated bypass valve such as the valve 30 shown in FIG. 1. The circuit of FIG. 4 may also be employed directly to operate a proportional bleed solenoid such as Semco-bype MSC-5700, which would in turn modify the reference pressure for existing types of Bendix fuel controllers. By way of specific example, the circuit would be applicable to the Bendix controllers employed with the Pratt & Whitney engine on King Air Turboprop Model 100 aircraft. More specifically, the present system is directly applicable to operate with Bendix Fuel Controllers used on the following indicated types of engines: Bendix Fuel Controller DPF2 used with Pratt & Whitney PT6-28 engines, Controllers DPF2, employed with engine type PT6-41, Fuel Controller type DPF2, used with engine type PT6-20, and Fuel Controller type DPF2, used with engine type PT6-6.

In closing, it may be noted that, in addition to the other advantages mentioned above, the push-button power settings simplify aircraft operation, and avoid the need for memorization by the pilot of power settings appropriate for approach, economical cruising, and so forth.

In conclusion, the present invention has been described in terms of one illustrative embodiment. It is to be understood that the principles of the invention could be implemented by other types of hardward and electronic logic circuits, if desired, and that power or thrust control of full jet engines could be managed as described hereinabove for the torque output of turboprop type turbine engines. Accordingly, the scope of the present invention is to be determined in accordance with the appended claims.

What is claimed is:

1. A fail-safe turbine engine power management system comprising:
   a turbine engine;
   a principal fuel supply path from the fuel pump to the turbine engine fuel nozzles;
   a by-pass fuel control line for selectively diverting a portion of the fuel from said principal fuel supply path;
   a power management system valve for controlling fuel flow through said by-pass line;
   means for normally mechanically biasing said control valve into the closed position;
   means for measuring the output power of said engine;
   push-button type control means for selecting the desired operating power for said engines, said push-button control means including means for selecting at least three different discrete power levels with the turbine engine running;
   electronic circuit means for providing an output power control signal for varying the position of said control valve; and
   means for varying said control signal and the resultant fuel flow as a function of the difference between the measured output power and the preselected desired output power.

2. A power management system as defined in claim 1 wherein said control signal varying means includes means for changing said control signal at a rate which varies in accordance with a non-linear function of the rate of change of power.

3. A power management system as defined in claim 1 wherein said electronic circuit means has a time constant and wherein means are provided for varying said time constant to provide rapid large signal response without overshoot.

4. A fail safe power management system as defined in claim 1 wherein said valve is an electromagnetically controlled valve having one coil terminal grounded, and the other coil terminal connected to receive a power control signal from said electronic circuit means, wherein short circuiting of said power control signal will result in closing of said by-pass valve.

5. A power management system as defined in claim 1 wherein said system includes a plurality of turbine engines and means for controlling each of them in accordance with said push-button type control means.

6. A power management system as defined in claim 1 further comprising means for sensing the temperature of each said turbine engine and for providing a temperature control signal when the engine overheats; and means for combining the output power and temperature control signals and to apply a single control signal to the fuel control valve associates with each engine.

7. An aircraft turbine engine power management system comprising:
   at least one turbine engine,
   means for measuring the output power of said turbine engine;
   push-button type switching means for producing an electronic signal representing the desired operating power for said engine, said push-button switching means including means for selecting at least three different discrete power levels with the turbine engine running;
   means for mounting said push-button switching means on the aircraft control wheel, whereby the pilot may control the push-button switching means rapidly and conveniently when required;
   means for indicating the selected power level; and
   means responsive to the measured output power and the electronic signal representing desired output power for electronically controlling the fuel supplied to said engine to supply the desired output power.

8. A power management system as defined in claim 7 wherein said system includes a plurality of turbine engines; means for sensing the temperature of each said turbine engine and for providing a temperature control signal when the engine overheats; means for combining the output power and temperature control signals and to apply a single control signal to the fuel control valve associated with each engine; and means for controlling both of said engines concurrently from a single operation of said push-button type switching means.

9. An aircraft turbine engine power management system as defined in claim 7 wherein electrical circuit means are included in said controlling means for varying the time constant of said controlling means to provide rapid large signal response without overshoot.

10. An aircraft turbine engine power management system as defined in claim 7 further comprising a plurality of preset electrical control circuit means to provide the precise desired power output from a particular turbine engine for each of a number of discrete levels of power; and means responsive to the actuation of said push-button type switching means for shifting control from one of said preset electrical control circuit means to another.

11. An aircraft turbine engine power management system as defined in claim 7 further including means for limiting the maximum output power from said turbine engine.

12. An aircraft turbine engine power management system as defined in claim 7 wherein said system includes electronic means for limiting the temperature at which said engine may operate and for limiting the maximum output power of said engine.

13. An aircraft turbine engine power management system as defined in claim 7 wherein thermal sensing means having a substantial delay in response is provided for sensing the temperature of said engine, and electronic means are provided for limiting the temperature at which said engine operates, said electronic means including means for varying the time constant of said controlling means to provide rapid large signal response without overshoot; whereby the overall delay in response is held to a sufficiently short period of time that the turbine engine is not damaged.

14. An aircraft turbine engine power management system as defined in claim 7 for example, further comprising means for displaying the output power of said engine.

15. An aircraft turbine engine power management system as defined in claim 7 further comprising means for limiting the maximum temperature at which said engine may operate, and trim bias means for normalizing the output temperature signal for said engine, whereby all similar type of engines may be "trimmed" to have substantially the same output temperature indicating signal.

16. A fail-safe turbine engine power management system comprising:

a principal fuel supply path from the fuel pump to the turbine engine fuel nozzles;

a by-pass fuel control line for selectively diverting a portion of the fuel from said principal fuel supply path;

a power management system valve for controlling fuel flow through said by-pass line;

means for normally mechanically biasing said control valve into the closed position;

means for measuring the output torque of said engine;

push-button type switching means for selecting the desired operating torque for said engines, said push-button control means including means for selecting at least three different discrete power levels with the turbine engine running; and means for automatically varying the position of said control valve to bring the output torque to a level approximately equal to the selected desired operating torque.

17. A power management system as defined in claim 16 further comprising a plurality of turbine engines, and means for controlling all said engines by the single push-button type switching means.

18. A power management system as defined in claim 16 wherein said push-button type switching means includes means for selecting any of at least three output power levels.

19. A power management system as defined in claim 8 wherein said push-button type switching means includes means for selecting any of at least four output power levels.

20. An aircraft power management system as defined in claim 16 further comprising means for mounting said push-button type switching control means on the control wheel of an aircraft powered by said engines.

21. A turbine engine power management system comprising:

a plurality of turbine engines, means for measuring the output power of each of said turbine engines;

means for measuring the operating temperature of each of said turbine engines, push-button type switching means for producing an electronic signal representing the desired operating power for said engines, said push-button switching means including means for producing electronic signals representing at least three different operating power levels for said engines, with the engines running;

means for indicating the selected power level;

means for electronically providing a power control signal to control the fuel supplied to each of said engines to supply the desired torque;

means responsive to the measured temperature in each of said engines to provide a temperature fuel limiting electrical signal when the temperature exceeds a predetermined level; and means for combining said power control signal and said temperature fuel limiting signal to provide a single control signal to each engine to normally provide power control signals to all engines, but to selectively apply temperature fuel limiting signals to an overheated engine, regardless of the power control signal for the overheated engine.

22. An aircraft power management system as defined in claim 21 further comprising:

means for mounting said discrete power selection switching means on an aircraft control wheel.

23. A turbine engine power management system as defined in claim 7 further comprising latching means for maintaining the signal selected by the operation of said push-button switching means.

24. A turbine engine power management system as defined in claim 23 wherein said latching means includes electronic latching circuitry.

25. An engine power management system as defined in claim 1 wherein said push-button control means includes means for selecting discrete power levels appropriate for each of the following flight conditions: (1) Take-Off, (2) Climb or Fast Cruise, (3) Normal Cruise, (4) Descend or Economy Cruise, and (5) Approach.

* * * * *